United States Patent
Calkins et al.

(10) Patent No.: US 10,100,944 B2
(45) Date of Patent: Oct. 16, 2018

(54) SHAPE MEMORY ALLOY ACTUATED BUTTERFLY VALVE

(71) Applicant: The Boeing Company, Chicago, IL (US)

(72) Inventors: Frederick T. Calkins, Renton, WA (US); Pruthvish V. Patel, Essex, MD (US); David A. Rathke, Everett, WA (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 14/816,345

(22) Filed: Aug. 3, 2015

(65) Prior Publication Data

US 2017/0037982 A1    Feb. 9, 2017

(51) Int. Cl.
*F16K 1/22* (2006.01)
*F16K 31/00* (2006.01)
*G05D 23/02* (2006.01)
*F16K 31/02* (2006.01)

(52) U.S. Cl.
CPC ............ *F16K 31/002* (2013.01); *F16K 1/221* (2013.01); *F16K 31/025* (2013.01); *G05D 23/025* (2013.01)

(58) Field of Classification Search
CPC ...... F16K 31/002; F16K 1/221; F16K 31/025; G05D 23/1852; G05D 23/1854; G05D 23/2754; G05D 23/27543; G05D 23/022; G05D 23/024; G05D 23/025
USPC ................................... 251/11, 305; 236/93 R
See application file for complete search history.

(56) References Cited

U.S. PATENT DOCUMENTS

| 3,782,349 | A | * | 1/1974 | Kamo | F02M 31/07 123/552 |
| 3,782,681 | A | * | 1/1974 | Blackstein | F16K 5/04 137/457 |
| 4,165,833 | A | * | 8/1979 | Nagel | F23N 3/047 236/1 G |
| 4,192,458 | A | * | 3/1980 | Pinnock | F24B 1/1885 126/502 |
| 4,284,235 | A | * | 8/1981 | Diermayer | F23N 3/047 236/1 G |
| 5,396,769 | A | * | 3/1995 | Brudnicki | F03G 7/065 60/527 |
| 7,757,962 | B2 | * | 7/2010 | Moser | G05D 23/022 137/625.33 |

(Continued)

*Primary Examiner* — John K Fristoe, Jr.
*Assistant Examiner* — Andrew J Rost
(74) *Attorney, Agent, or Firm* — McDonnell Boehnen Hulbert & Berghoff LLP

(57) ABSTRACT

Methods and systems for a butterfly valve including a shape memory alloy (SMA) tube trained for rotation are presently disclosed. The SMA tube has a ground end coupled to a housing and rotating end coupled to a plate. The SMA tube is configured to rotate in a first direction in response to a first temperature change of the SMA tube. When rotating in the first direction, the rotating end of the SMA tube rotates and deflects the plate to rotate in a direction that permits a medium to flow through the valve. The SMA tube is also configured to rotate in a second direction in response to a second temperature change of the SMA tube. When rotating in the second direction, the rotating end of the SMA tube rotates and deflects the plate to rotate in a direction that does not permits a medium to flow through the valve.

18 Claims, 4 Drawing Sheets

(56) References Cited

U.S. PATENT DOCUMENTS

2007/0267510 A1* 11/2007 Moser .................. G05D 23/022
236/93 R

* cited by examiner

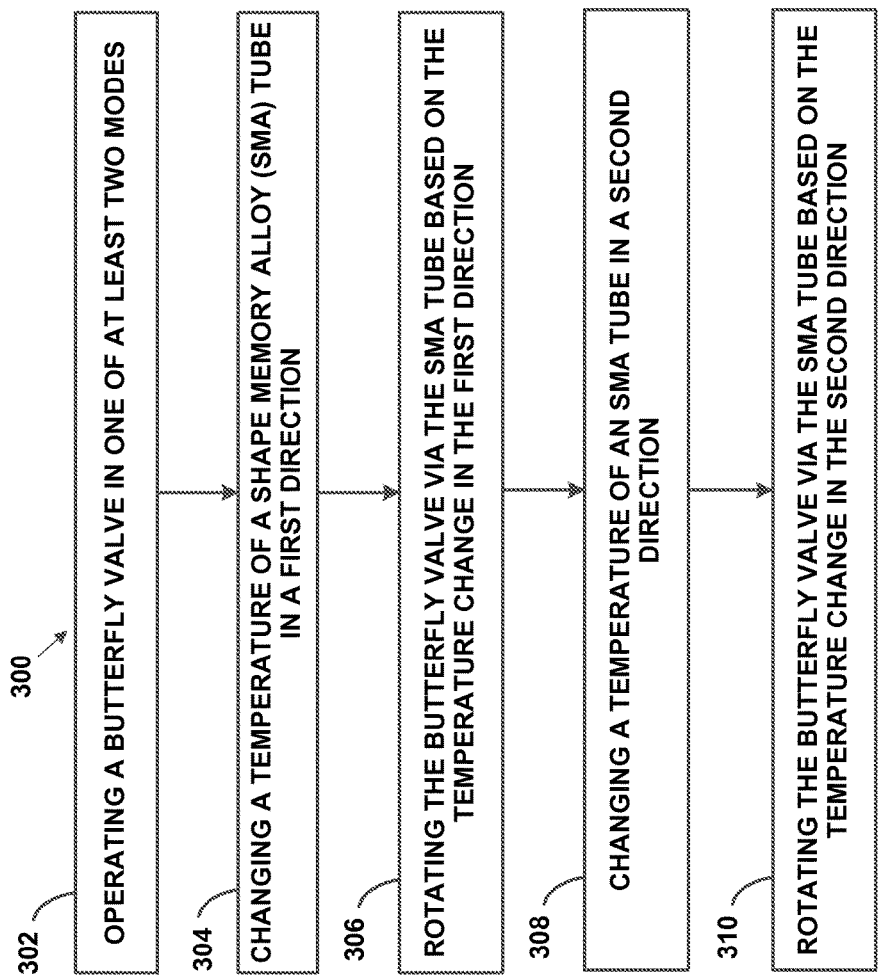

SHAPE MEMORY ALLOY ACTUATED BUTTERFLY VALVE

FIELD

Examples of the disclosure relate generally to the field of valve control systems, and more particularly to a butterfly valve with a shape memory alloy (SMA) tube.

BACKGROUND

Shape memory alloy (SMA) technology relates to metallic alloys that have shape-memory properties. In some examples, an SMA may "remember" a first shape. The SMA may be bent into a second shape. When the SMA is heated, it may return to the first shape. Thus, by heating the SMA, it returns to the remembered shape. Some SMAs may have two-way memory. An SMA with two-way memory may have a first pre-determined shape at a high temperature and a second pre-determined shape at a low temperature. Changing the temperature of the SMA may cause the SMA to move from the first pre-determined shape to the second pre-determined shape, or from the second pre-determined shape to the first pre-determined shape.

SUMMARY

An implementation of technology disclosed herein provides a butterfly valve. The butterfly valve includes a shape memory alloy (SMA) tube trained for rotation. The SMA tube has a ground end and a rotating end. The butterfly valve also includes a housing. The ground end of the SMA tube is coupled to the housing. The butterfly valve also includes a plate coupled to the rotating end of the SMA tube. The SMA tube is configured to rotate in a first direction in response to a first temperature change of the SMA tube. When rotating in the first direction, the rotating end of the SMA tube rotates and deflects the plate to rotate in a direction that permits a medium to flow through the valve. The SMA tube is also configured to rotate in a second direction in response to a second temperature change of the SMA tube. When rotating in the second direction, the rotating end of the SMA tube rotates and deflects the plate to rotate in a direction that does not permits a medium to flow through the valve. The first temperature change and the second temperature change are temperature changes in opposite directions.

Another implementation disclosed herein provides a method of controlling a butterfly valve. The method includes operating a butterfly valve in one of at least two modes. A first mode permits a medium to flow through the valve, and a second mode inhibits the medium from flowing through the valve. The method also includes switching from the first mode to the second mode based on changing a temperature of a shape memory alloy (SMA) tube in a first direction. The SMA tube is trained for rotation and the SMA tube is coupled to a housing at a ground end and to a plate at a rotating end. The switching from the first mode to the second mode is performed by rotating the butterfly valve via the SMA tube based on the temperature change in the first direction. The method also includes switching from the second mode to the first mode based on changing the temperature of a shape memory alloy (SMA) tube in a second direction. The switching from the second mode to the first mode is performed by rotating the butterfly valve via the SMA tube based on the temperature change in the second direction.

In yet another implementation, a butterfly valve configured to selectively control the flow of a medium. The butterfly valve includes a rotatable plate configured to have a first position and a second position. The first position permits a medium to flow through the valve and the second position does not permit a medium to flow through the valve. The butterfly valve also includes a shape memory alloy (SMA) tube trained for rotation having a ground end and rotating end. The ground end of the SMA tube is coupled to a valve housing and the rotating end is coupled to the rotatable plate. The SMA tube is configured to rotate in a first direction in response to a first temperature change of the SMA tube, and rotate in a second direction in response to a second temperature change of the SMA tube. The first temperature change and the second temperature change are temperature changes in opposite directions.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative implementations are set forth in the appended claims. The illustrative implementations, however, as well as a preferred mode of use, further objectives and descriptions thereof, will best be understood by reference to the following detailed description of an illustrative implementation of the present disclosure when read in conjunction with the accompanying drawings, wherein:

FIG. 3 is a diagrammatic representation of a method of use with the SMA tube coupled to a butterfly valve.

DETAILED DESCRIPTION

Figure 1:
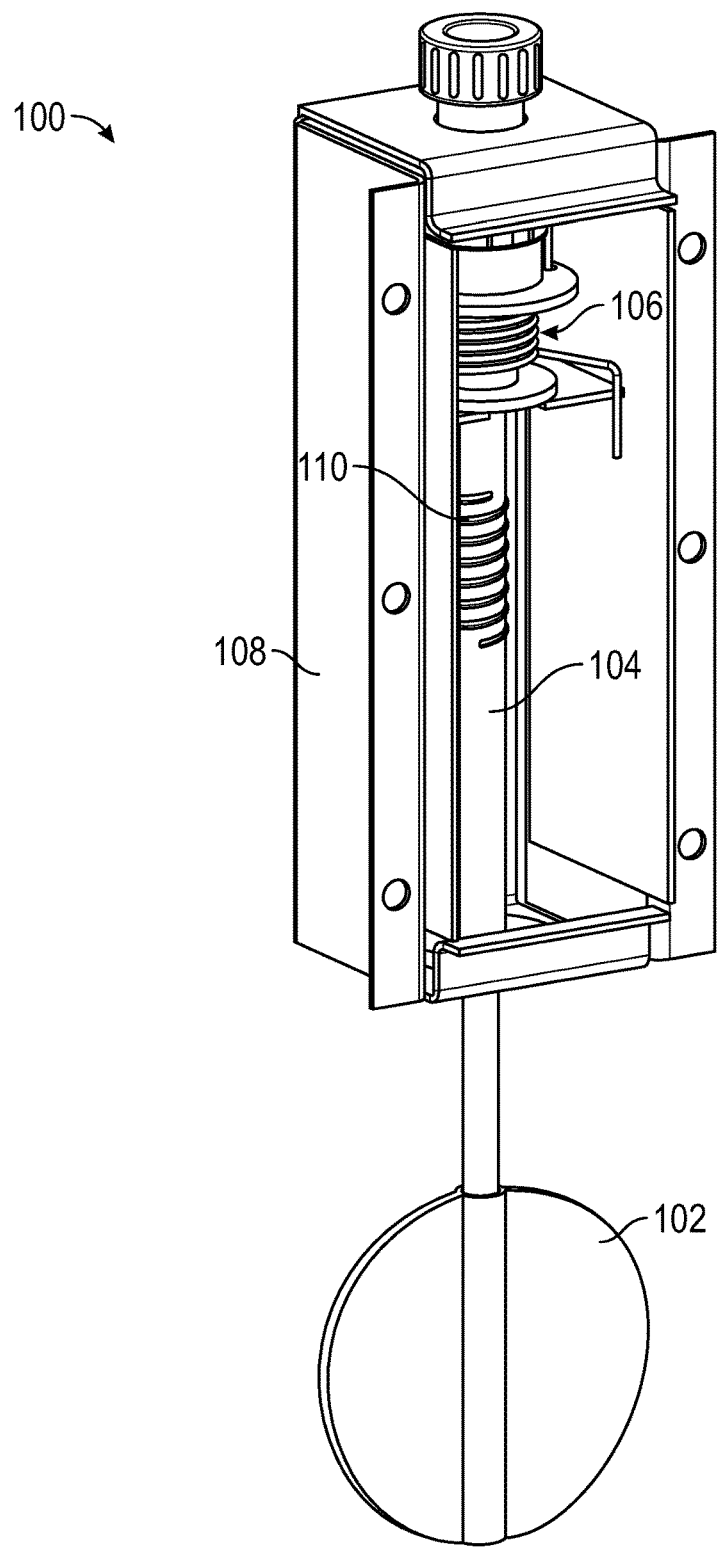
FIG. 1 is a diagrammatic representation of an SMA tube coupled to a butterfly valve.

Disclosed implementations of the technology will now be described more fully hereinafter with reference to the accompanying drawings, in which some, but not all of the disclosed examples are shown. Indeed, several different implementations may be provided and should not be construed as limited to the implementations set forth herein. Rather, these implementations are provided so that this disclosure will be thorough and complete and will convey the scope of the disclosure to those skilled in the art.

Systems and methods for an SMA-activated butterfly valve for use for purposes of controlling the flow of liquids or gasses are presented herein. The SMA-activated butterfly valve disclosed herein may be actuated without the need for a mechanical motor to open or close the valve. For example, the heating or cooling of the SMA may activate the presently disclosed SMA-activated butterfly valve. When the SMA is heated (or cooled), it may move to a remembered shape or geometry and cause the butterfly valve to open.

Systems and methods may heat or cool the SMA in various ways depending on the implementation. In one instance, the SMA may be coupled to or in contact with a heating element, such as wire. By causing electricity to flow through the wire, the wire may increase in temperature, thus heating the SMA. Therefore, by controlling electricity flowing in the wire, the butterfly valve may be opened or closed. Consequently, a motor may not be needed for controlling the butterfly valve as the SMA tube in essence acts as the motor. Because a motor is not needed, the butterfly valve may be made more inexpensive, less complicated and lighter in weight than valves having motors.

Within additional implementations, the SMA coupled to the butterfly valve may be heated in other ways. In some implementations, the SMA tube may be located in a region where the SMA may be in contact with a medium, such as a fluid, a gas, or other medium. The temperature of this medium may transfer to the SMA tube. In one implementation, the SMA tube may be located in an oil pipeline. The temperature of the SMA may be similar to or the same as the temperature of the oil in which it is located. As the oil changes temperature, the temperature of the SMA may correspondingly change. Thus, when the oil temperature increases above (or decreases below) a threshold activation temperature for the SMA, the SMA may change shape. The shape change may open or close a butterfly valve. It may be advantageous to have the valve controlled by an SMA rather than a computer, motor, or other controlling device as the system may be made more inexpensively and more reliably. Further, it may also be desirable for the butterfly valve to operate in a passive manner (i.e. operate without any external control system).

In one implementation, an SMA may be made out of Nitinol®, a Nickel-Titanium alloy. In order to achieve the shape-memory properties previously described, SMA alloys may undergo a crystalline structure phase change with temperature change which results in change in shape as well as material properties, i.e. having a low modulus at low temperature in a Martensitic phase and having a high modulus at high temperature in an Austenitic phase. The modulus of an SMA alloy is a measure of the elastic deformation of the material. When an SMA alloy has a low modulus it may be more flexible and when the modulus is high it may be more stiff. "Actuation," i.e. shape change, is achieved by adding or removing heat. A Nickel-Titanium alloy SMA tube may have an activation temperature between 70 and 110 degrees Celsius.

In some examples, in order to make use of the shape memory property, each tube may be "trained." Training may consist of deforming the tube many thousands of times as it passes through the phase transition temperature. SMA tubes may complete training for use after approximately 4,000 training cycles.

In some implementations, an SMA tube can only be commanded in one direction by heating, therefore two tubes may be splined in series, in order to create a back-and-forth operation. By selecting the proper orientation of the application of temperature, one tube rotates the control surface in an upward direction and the other rotates the control surface in a downward direction. However, in other implementations, a tube may be paired with a spring to create the back-and-forth movement. Thus, the tube may deflect in a first direction in response to applied heat and when the heat is removed, the spring may return the tube back to its original shape. In yet another implementation, a tube may be created that can be commanded between a first and second position by changing the temperature of the tube between a hot and cold temperature. When cold, the SMA tube may have a first shape. When heated to the hot temperature, the SMA tube may have a second shape. When the tube cools, it may return to the first shape.

Referring now to the figures, FIG. 1 is a diagrammatic representation of a system 100 including a butterfly valve 102 coupled to an SMA tube 104. The SMA tube 104 may be further coupled to a spring 106. In FIG. 1, the SMA tube 104 and the spring 106 are located within a housing 108. As shown in FIG. 1, the SMA tube 104 may be coupled to both a fixed component, such as the housing 108, and the butterfly valve 102. Additionally, the SMA tube may be in contact with a heating component 110. The heating component 110, as shown in FIG. 1, may be a wire configured to change the temperature of the SMA 104.

The butterfly valve 102 of FIG. 1 may be located in a tube or pipe configured to transport a medium, such as a fluid, a gas. The butterfly valve 102 may take the form of a plate and be able to rotate to allow or inhibit the movement of the medium. When the butterfly valve 102 is in a position to allow the medium to flow, the butterfly valve 102 may be in an open state. When the butterfly valve 102 is in a position to inhibit the medium to flow, the butterfly valve 102 may be in a closed state. Various means may be used to rotate the butterfly valve between opened and closed states. In many traditional systems, the butterfly valve 102 is controlled by a motor. However, a motor may add significant cost, weight, and complexity to a system. In some examples, the motor and associated system may add approximately two pounds per respective valve. Thus, as disclosed herein, an SMA tube 104 may be used to control the rotation of the butterfly valve 102.

The SMA tube 104 may be similar to the SMA tubes described above. The SMA tube 104 may have two different primary forms of operation depending on the specific example. In the first example, the SMA tube 104 may have the butterfly valve 102 open while the tube is in a first state and the SMA tube 104 may close the butterfly valve 102 when the tube is heated. In the second example, the SMA tube 104 may have the butterfly valve 102 closed while the tube is in a first state and the SMA tube 104 may open the butterfly valve 102 when the tube is heated. In both examples, either a cooling of the SMA tube 104 or a spring 106 may cause the butterfly valve 102 to return to the first state.

In order to open and close butterfly valve 102, the SMA tube 104 may be coupled (i.e. anchored) to a fixed component, such as housing 108, at one end. The other end of the SMA tube 104 may be coupled to the butterfly valve 102. Thus, the torque generated by the movement of the tube will cause the opening and/or closing of the butterfly valve. In some examples, the heating of the SMA tube 104 may cause the butterfly valve 102 to open in a time from on the order of from 1 to 10 seconds.

In order to heat the SMA tube 104, the SMA tube 104 may be in contact with a heating element 110. As shown in FIG. 1, the heating element 110 may be a wire that is in contact or in close proximity to SMA tube 104. The wire may be highly resistive and increase in temperature as electricity flows through the wire. An example wire may be made from a nickel-chrome alloy. In another example, strip heaters may be used to heat the SMA tube 104. Thus, the butterfly valve 102 may be opened or closed by the application of electricity to the heating element. The SMA tube 104 may also be heated via the medium itself, as described below. Other types of heating elements may be used as well.

Figure 2A:
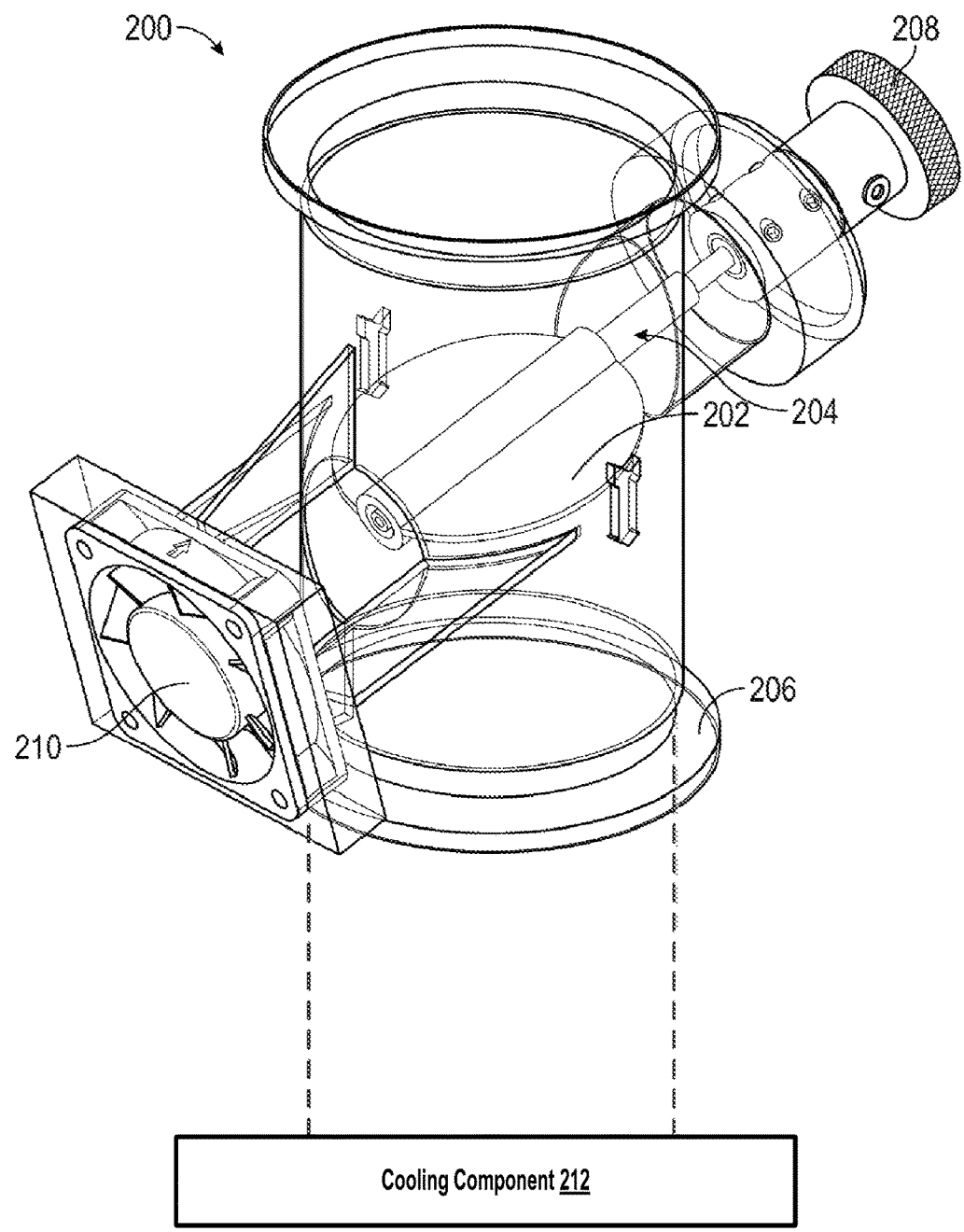
FIG. 2A is a diagrammatic representation of an SMA tube coupled to a butterfly valve having a closed position.
Figure 2B:
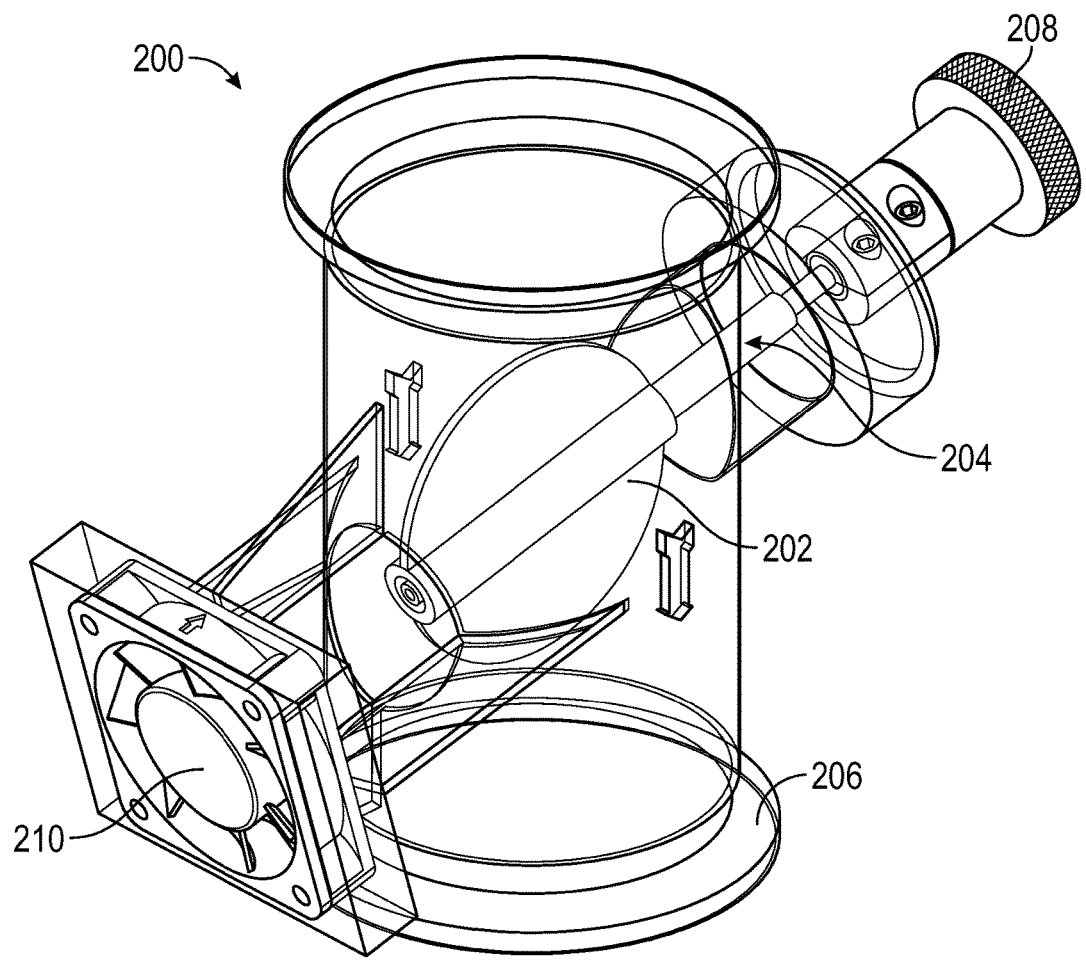
FIG. 2B is a diagrammatic representation of an SMA tube coupled to a butterfly valve having an open position.

FIGS. 2A and 2B are a diagrammatic representations of a system 200 including a butterfly valve 202 coupled to an SMA tube 204. The butterfly valve 202 is shown in the closed position in FIG. 2A and in an open position in FIG. 2B. The butterfly valve 202 and SMA tube 204 may be inside of a pipe (or other housing) 206. In the implementation shown in FIGS. 2A and 2B, the system may not include a spring as previously discussed with respect to FIG. 1. As previously discussed with respect to FIG. 1, the SMA tube 204 may have two different primary forms of operation depending on the specific implementation. In the first implementation, the SMA tube 204 may have the butterfly valve 202 open while the tube is in a first state and the SMA tube 204 may close the butterfly valve 202 when the tube is heated. In the second implementation, the SMA tube 204 may have the butterfly valve 202 closed while the tube is in a first state and the SMA tube 204 may open the butterfly valve 202 when the tube is heated. In both implementations, either a cooling of the SMA tube 204 (or a spring, not shown in either FIG. 2A or FIG. 2B) may cause the butterfly valve 202 to return to the first state.

The SMA tube 204 may be located in a position where the medium flowing through the pipe 206 comes in contact with the SMA tube 204. Based on the temperature of the medium, the temperature of the SMA tube 204 may change to correspond with the medium temperature. Thus, the SMA tube 204 may function as a feedback mechanism based on the temperature of the fluid that flows through pipe 206. In various implementations, the SMA tube may either cause the butterfly valve 202 to open or close based on the specific design.

In one implementation, the pipe 206 may be configured to enable the flow of oil. In some systems, it may be desirable for oil to be kept below a threshold temperature. The threshold temperature for the oil may be the same or close to the threshold temperature that causes the SMA tube 204 to change shape. Thus, if the oil increases in temperature above the threshold temperature that causes the SMA tube 204 to change shape, the butterfly valve 202 may be opened. When the butterfly valve 202 is opened, the oil that is near or above the threshold temperature may be able to flow through the pipe 206 that was previously closed by the butterfly valve 202. When the oil flows through the pipe 206, it may go to an apparatus 212 that cools the oil. As the oil cools and falls below the threshold temperature the butterfly valve 202 may close. Thus, the butterfly valve 202 and SMA tube 204 may be used to control the temperature of the oil without needing outside equipment to either measure the oil temperature or control the valve.

System 200 may also include a manual operation knob 208 and a fan 210. The manual operation knob 208 allows the butterfly valve 202 to be opened or closed without use of the SMA tube. In some examples, the manual operation knob 208 may be turned by a human operator to open and/or close the butterfly valve 202. In some additional examples, the manual operation knob 208 may be connected to a motor or other device that can turn the manual operation knob 208. Thus, the manual operation knob 208 may act as a backup to control the butterfly valve 202 instead of using the SMA tube. The fan 210 is one example of how the SMA tube may be cooled (or heated). The fan 210 may circulate a gas or fluid within the housing 206 to cause the temperature change of the SMA tube 204. In one example, as shown in FIGS. 2A and 2B, the butterfly valve 202, SMA tube 204, manual operation knob 208, and fan 210 may be mounted on a common axis.

Method 300 shown in FIG. 3 presents an implementation of a method that, for example, could be used with the devices shown in FIGS. 1-2. In other implementations, components of the devices and/or systems may be arranged to be adapted to, capable of, or suited for performing the functions. Method 300 may include one or more operations, functions, or actions as illustrated by one or more of blocks 302-310.

At block 302, the method 300 includes operating a butterfly valve 102, 202 in one of at least two modes. Operating the butterfly valve 102 in a first mode is a mode where the butterfly valve 102, 202 permits a medium to flow through the valve 102. Operating the butterfly valve 102, 202 in a second mode is a mode where the butterfly valve 102, 202 inhibits the medium from flowing through the valve. As previously discussed, the butterfly valve 102, 202 may be located in a pipe or tube 206 that is configured to allow a gas or liquid to flow. The butterfly valve 102, 202 may be opened or closed to selectively control whether the gas or liquid may flow through the pipe or tube 206. The mode may be changed from the first mode to the second mode by increasing the temperature of the SMA tube 104, 204. The mode may be changed from the second mode to the first mode by decreasing the temperature of the SMA tube 104, 204.

At block 304, the method 300 includes changing a temperature of an SMA tube 104 in a first direction. The changing of the temperature of the SMA tube 104 may be a heating or cooling the SMA tube 104 (above or below a threshold temperature). The heating or cooling of the SMA tube 104 may be performed in various ways depending on the example. In one instance, in order to heat the SMA tube 104, the SMA tube 104 may be coupled to, or in contact with, a heating element, such as wire. By causing electricity to flow the through the wire, the wire may increase in temperature, thus heating the SMA 104. Within additional examples, the SMA tube 104 may be heated in other ways. The SMA tube 104 may be located in a region of a device where the SMA tube 104 may be in contact with a medium, such as a fluid, a gas. The temperature of this medium may transfer to the SMA tube 104. As the medium changes temperature, the temperature of the SMA tube 104 may correspondingly change.

Although the first temperature change was previously described as adding heat, the first temperature change may also be removing heat. For example, the medium may be cooled and responsively cause a temperature decrease of the SMA tube 104. In another implementation, a heating component 110 coupled to the SMA tube 104 may be turned off, causing a cooling of the SMA tube 104. Thus, the first temperature change may be a temperature increase or decrease for the SMA tube 104, depending on the respective implementation.

At block 306, the method 300 includes rotating the butterfly valve 102 via the SMA tube 104 based on the temperature change in the first direction. When the temperature of the SMA tube 104 increases above (or decreases below) a threshold activation temperature for the SMA tube 104, the SMA tube 104 may change shape. The shape change of the SMA tube 104 may cause a corresponding rotation of the SMA tube 104. The SMA tube 104 may be coupled to a housing 108 at a ground end and to a butterfly valve 102 at a rotating end. Thus, the shape change of the SMA tube 104 may cause a rotation of the butterfly valve 102. For an implementation as previously described, an SMA tube 102 may be made out of Nitinol®, a nickel-titanium alloy. In order to achieve the shape-memory properties that cause the movement of the SMA tube 104 in response to the temperature change, SMA alloys may undergo a crystalline structure phase change with temperature change which results in change in shape.

The shape change may open or close a butterfly value 102. Therefore, the SMA tube 102 may be used in conjunction with a butterfly valve 102 to open or close the valve in response to the temperature change of the SMA tube 104. It may be advantageous to have the valve 102 controlled by an SMA tube 104 rather than a computer, motor, or other controlling device as the system may be made more inexpensively and more reliably. Further, it may also be desirable for the butterfly valve 102 to operate in a passive manner (i.e. operate without any external control system).

At block 308, the method 300 includes changing a temperature of a SMA tube 104 in a second direction. Similar to block 304, the changing of the temperature of the SMA tube 104 may be a heating or cooling the SMA tube 104 (above or below a threshold temperature). Because the SMA tube 104 has shape-memory properties that are temperature dependent, the temperature change in the second direction may cause the movement of the SMA tube 104 (caused by the temperature change at block 304) to be reversed. Generally, to cause the movement of the SMA tube 104 to be reversed, the temperature change in the second direction will be a temperature change in the opposite direction of the first temperature change. For example, if the first temperature change was an increase in the temperature of the SMA tube 104, the second temperature change may be a decrease the temperature of the SMA tube 104. Alternatively, if the first temperature change was a decrease in the temperature of the SMA tube 104, the second temperature change may be an increase the temperature of the SMA tube 104.

At block 310, the method 300 includes rotating the butterfly valve 102 via the SMA tube 104 based on the temperature change in the second direction. As discussed above with respect to block 306, when the temperature of the SMA tube 104 increases above (or decreases below) a threshold activation temperature for the SMA, the SMA tube 104 may change shape. The shape change of the SMA tube 104 may cause a corresponding rotation of the SMA tube 104. The SMA tube 104 may be coupled to a housing 108 at a ground end and to a butterfly valve 102 at a rotating end. Thus, the shape change of the SMA tube 104 may cause a rotation of the butterfly valve 102.

As discussed above, the first and second temperature changes may be temperature changes in opposite directions. However, either the first or second temperature change may be a temperature increase. Thus, the other of the first or second temperature increase may be a temperature decrease. Additionally, the first or second rotation of the butterfly valve 102 is an opening of the valve 102. Thus, the other of the first or second rotation of the butterfly valve 102 may be closing of the valve 102. Further, at least one of the first or second rotation of the butterfly valve 102 may be caused by a torque generated by a movement of the SMA tube 104. Additionally, in some examples, one of the first or second rotation of the butterfly valve 102 may be caused by a spring 106 coupled to the butterfly valve 102. The spring 106 may cause the movement of the butterfly valve 102 in response to a relaxing of the SMA tube 104 caused by one of the temperature changes. Thus, the spring 106 may counteract the movement of the SMA tube 104 when the SMA tube 104 relaxes (i.e. the spring 106 may cause the SMA tube 104 to return to its first position).

Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of controlling a butterfly valve comprising:
circulating a medium around a shape memory alloy (SMA) tube by a fan;
operating a butterfly valve in one of at least two modes, wherein:
a first mode that permits the medium to flow through the valve, and
a second mode that inhibits the medium from flowing through the valve;
switching from the first mode to the second mode based on:
changing a temperature of the SMA tube in a first direction, wherein the SMA tube is trained for rotation, and the SMA tube is coupled to a housing at a ground end and to a plate at a rotating end, wherein the medium and the SMA tube are in contact, and
rotating the butterfly valve via the SMA tube based on the temperature change in the first direction; and
switching from the second mode to the first mode based on:
changing a temperature of the SMA tube in a second direction, and
rotating the butterfly valve via the SMA tube based on the temperature change in the second direction; and
manually switching from the first mode to the second mode based on a rotation of a manual operation knob coupled to the plate,
wherein the rotating is about a common axis defined by the butterfly valve, SMA tube, manual operation knob, and fan.

2. The method claim 1, wherein at least one of the rotations of the butterfly valve is assisted by a spring coupled between the rotating end of the SMA tube and the housing.

3. The method claim 1, further comprising a temperature-adjustment component coupled to the SMA tube configured to change the temperature of the SMA tube.

4. The method claim 3, wherein the temperature-adjustment component comprises a resistive wire.

5. The method claim 1, wherein the medium provides the temperature change.

6. The method claim 1, wherein the SMA has an opening activation temperature.

7. The method claim 1, wherein the SMA has a closing activation temperature.

8. A butterfly valve comprising:
a shape memory alloy (SMA) tube trained for rotation having a ground end and rotating end, wherein a medium and the SMA tube are in contact;
a housing, wherein the ground end of the SMA tube is coupled to the housing;
a fan configured to circulate the medium around the SMA tube;
a plate coupled to the rotating end of the SMA tube, wherein the SMA tube is configured to:
  rotate in a first direction in response to a first temperature change of the SMA tube, wherein the rotating end of the SMA tube rotates and deflects the plate to rotate in a direction that permits the medium to flow through the valve, and
  rotate in a second direction in response to a second temperature change of the SMA tube, wherein the rotating end of the SMA tube rotates and deflects the plate to rotate in a direction that does not permit the medium to flow through the valve, and wherein the first temperature change and the second temperature change are changes in opposite directions; and
a manual operation knob coupled to the plate, wherein the manual operation knob is configured to cause a deflection in the plate,
wherein the butterfly valve, SMA tube, manual operation knob, and fan are mounted on a common axis.

9. The butterfly valve of claim 8, further comprising a spring coupled between the rotating end of the SMA tube and the housing.

10. The butterfly valve of claim 8, further comprising a temperature-adjustment component coupled to the SMA tube.

11. The butterfly valve of claim 10, wherein the temperature-adjustment component comprises a resistive wire.

12. The butterfly valve of claim 8, wherein the medium provides the temperature increase and temperature decrease.

13. The butterfly valve of claim 8, wherein the SMA has an opening activation temperature.

14. The butterfly valve of claim 8, wherein the SMA has a closing activation temperature.

15. A butterfly valve configured to selectively control the flow of a medium comprising:
a rotatable plate configured to have a first position and a second position, wherein the first position permits a medium to flow through the valve and the second position does not permit a medium to flow through the valve;
a shape memory alloy (SMA) tube trained for rotation having a ground end and rotating end, wherein the ground end of the SMA tube is coupled to a valve housing and the rotating end is coupled to the rotatable plate, wherein the medium and the SMA tube are in contact;
a fan configured to circulate the medium around the SMA tube;
a manual operation knob coupled to the rotatable plate, wherein the manual operation knob is configured to cause a deflection in the rotatable plate; and
wherein the SMA tube is configured to:
  rotate in a first direction in response to a first temperature change of the SMA tube, and
  rotate in a second direction in response to a second temperature change of the SMA tube, and wherein the first temperature change and the second temperature change are changes in opposite directions,
  wherein the butterfly valve, SMA tube, manual operation knob, and fan are mounted on a common axis.

16. The butterfly valve of claim 15, further comprising a spring coupled between the rotating end of the SMA tube and the housing.

17. The butterfly valve of claim 15, further comprising a temperature-adjustment component coupled to the SMA tube, wherein the temperature-adjustment component comprises a resistive wire.

18. The butterfly valve of claim 15, wherein the medium and the SMA tube are in contact and the medium provides the temperature change.

* * * * *